United States Patent [19]

Giddey et al.

[11] Patent Number: 4,770,890

[45] Date of Patent: Sep. 13, 1988

[54] METHOD OF MANUFACTURING BISCUIT-TYPE ARTICLES

[75] Inventors: Claude Giddey, Geneva; Guy Bunter, Carouge, both of Switzerland

[73] Assignee: Battelle Memorial Institute, Geneva, Switzerland

[21] Appl. No.: 926,882

[22] Filed: Nov. 6, 1986

Related U.S. Application Data

[63] Continuation of Ser. No. 692,226, Jan. 17, 1985, abandoned.

[30] Foreign Application Priority Data

Jan. 26, 1984 [CH] Switzerland ............................ 357/84

[51] Int. Cl.$^4$ ................................................ A23P 1/00
[52] U.S. Cl. .............,........................ 426/549; 426/454
[58] Field of Search ............... 426/453, 454, 455, 560, 426/549, 19, 523

[56] References Cited

U.S. PATENT DOCUMENTS

| | | | |
|---|---|---|---|
| 1,189,130 | 6/1916 | Kellogg | 426/453 |
| 2,421,112 | 5/1947 | Brooks | 426/497 |
| 2,738,277 | 3/1956 | Cryns | 426/622 |
| 3,158,486 | 11/1964 | Morck et al. | 426/523 |
| 3,473,931 | 10/1969 | Respoli et al. | 426/458 |
| 3,812,268 | 5/1974 | Corey et al. | 426/454 |
| 4,344,975 | 8/1982 | Seiler | 426/453 |
| 4,650,685 | 3/1987 | Persson et al. | 426/454 |

FOREIGN PATENT DOCUMENTS

| | | | |
|---|---|---|---|
| 3081 | of 1875 | United Kingdom | 426/19 |
| 13734 | of 1886 | United Kingdom | 426/19 |
| 208257 | 12/1923 | United Kingdom | 426/560 |

*Primary Examiner*—Donald E. Czaja
*Assistant Examiner*—Carolyn Paden
*Attorney, Agent, or Firm*—Cushman, Darby & Cushman

[57] ABSTRACT

A biscuit dough is kneaded, while at the same time being heated, in such a way that it is fragmented into granules which are baked at oven temperature either simultaneously or in a hot-air stream; biscuits are subsequently formed as a result of the caking of these granules.

9 Claims, No Drawings

METHOD OF MANUFACTURING BISCUIT-TYPE ARTICLES

This is a continuation of application Ser. No. 692,226, filed Jan. 17, 1985, which was abandoned upon the filing hereof.

The present invention relates to the sector of bakery food products, especially biscuit-type products, such as biscuits, shortbread, crackers, petits fours and the like.

According to conventional practice, to produce such foodstuffs, a dough is first prepared by means of the customary ingredients (flour or various cereals, fatty substances, sweetening sugars, milk, seasoning products, salt, yeast, aroma and the like) which are kneaded to the desired consistency. The dough is then worked (by rolling, layering and the like), in order to shape the biscuit-type articles which are to be obtained, and these are passed through an oven at temperatures of the order of 150° to 280°, depending on the type of article in question, until the desired degree of baking is reached.

This conventional technique, although used for a very long time, has certain disadvantages, among which there can be mentioned the lack of preservation of certain ingredients, such as fatty substances and whole milk, and the relatively high expenditure of energy during baking. In fact, especially where relatively large-sized articles are concerned, the heating period has to be long enough to ensure that most of the water present in the dough evaporates during baking, since the dough must be homogeneous up to the very center of the article.

The invention which relates to a process for producing biscuit-type articles overcomes these disadvantages.

Broadly stated, the present process involves the following steps:

(a) the ingredients required to make the dough for the baked article are intimately mixed together using a reduced quantity of water from that conventionally used to form the dough, i.e. a quantity of water which is between 10 and 70% of the water normally used to prepare the dough for the article in question;

(b) the resulting mixture is then fragmented into granules;

(c) the granules are baked; and (d) the baked article is then formed by pressing the granules together and caking in a mold. Step (c) can be carried out after step (b) or during step (b).

It will be noted that the possibility of producing biscuit-type articles as a result of the caking of prebaked or preroasted dough granules, without the essential use of a binder, is surprising, because a person skilled in the art would be unable to foresee that, under such conditions, sufficient agglomeration of these particles would occur, under pressure, to ensure that the article thus produced would have a mechanical stability and homogeneity comparable to those of biscuits prepared by conventional means. However, it is clear that, during the pressing operation, it is possible to affect the affinity between particles and the crumbling resistance of the pressed biscuit by adding binding or agglomerating agents, such as lactose, alginates, dextrins, carrageenates, etc.

It will be noted, however, that the principle by which biscuit-type articles can be produced from granulated ingredients is known per se. Thus, the document EP-A-No. 113,056 describes the preparation of a biscuit of malleable consistency, composed of granules of an expanded baked base which are coated with a high proportion of a sugared binder and which are agglomerated by pressing.

Another document, namely U.S. Pat. No. 3,393,074, discloses the preparation of cakes and puddings of relatively high water content by means of the agglomeration of crumbs of fragments of prebaked dough, the agglomeration of these by means of a binder and their pressing (at low pressure), and the article obtained which has a soft texture.

The document FR-A-No. 2,124,734 relates to the preparation of biscuits by means of the agglomeration of fragments of oatmeal-based dough. This process involves preparing a dough consisting of flour and water (10 to 20% by weight of moisture), converting this dough into flakes (as a result of expansion), drying these flakes in a hot-air air stream (temperature of 204° to 427° C.), reducing these dried flakes to granules, mixing them with a binder (one part of binder to two to three parts of fragments), pressing the mixture in a mold and drying the molded biscuits until a moisture content of 4 to 5% is reached.

The document GB-A-No. 208,257 describes the production of biscuits according to a process involving baking the flour in a dry powdery state and subsequently molding the latter into shape under high pressure.

The document FR-A-No. 2,409,007 describes a process, according to which bread products (for example, bread crumbs, rusks, toast, bread scraps, etc.) are dried or toasted and then crushed, and the crushed product is subjected to extrusion baking.

Finally, the document FR-A-No. 2,382,860 describes how a mixture of broken biscuits, water and eggs is used to produce bakery articles, the entire mixture being kneaded, shaped and baked in the oven.

It will be noted, however, that none of the documents mentioned above discloses at the same time the fragmentation of the dough into unexpanded particles, the rapid baking of these, for example in a fluidized bed, and the caking of these particles thus baked in the form of biscuit-type articles, the product obtained closely resembling the corresponding articles obtained by conventional means.

By the reduction of a considerable quantity of the water necessary for the conventional preparation of the dough is meant that only quantities between 10 and 70% of the quantity normally employed are preferably used. Thus, although, for 1 kg of ordinary biscuit dough, the quantity of water present normally amounts to 400 g, in the process of the invention this quantity will preferably be of the order of 40 g to 240 g. The process of the invention is advantageous in economic terms partly because of the small quantity of water present at the outset and consequently because of the relatively small amount of energy required to evaporate it during baking.

To carry out the mixing of the ingredients which is mentioned in step (a) the customary means of kneading bakery doughs can be used. However, since this mixture incorporates a lower quantity of water then normal, it is also suitable to use paddle mixers, such as those employed to homogenize mixtures of relatively dry consistencies (for example, the "HOBART MIXER").

To execute step (b), a steam-heatable kneader is preferably used; however, any other appliance with similar properties is also suitable. Preferably, the temperature appropriate for step (b) is between ambient temperature (approximately 20° C.) and 280° (the oven temperature).

Of course, the lower temperatures in this range, for example between 20° and 130° correspond to the alternative form, in which the dough is only fragmented into particles or granules, the actual baking taking place after this fragmentation, whereas when the higher temperatures in this range (for example, between 130° and 280° C.) are adopted, the baking of the particles takes place simultaneously with fragmentation.

The granules resulting from the fragmentation of the dough in step (b), for example between 20° and 130° C., can subsequently undergo baking just as they are. However, to achieve greater homogeneity in the finished product, these granules can be further reduced in a granulating machine (for example, ALEXANDER-WERK GRANULATOR) to dimensions of a few millimeters, for example 1 to 5 mm. The granules can also be screened and thus separated into categories according to their size. In fact, during caking, the size of the granules can have a bearing on the texture of the biscuit that is obtained and consequently on its taste properties ("mouth feeling"). To make it easier to carry out the post-granulation mentioned above, the fragments resulting from step b) can be moistened slightly beforehand, for example by means of water, glycerol or aqueous solutions of polysaccharides.

To execute step (c), that is to say the baking of the granules if this has not already taken place during fragmentation, the granules are suspended and agitated in a stream of hot air which is forced or in the form of a fluidized bed. It is possible, for example, to use a vertical column which contains the granules and into the bottom of which heated air is conveyed by conventional means. In general terms, the temperature of this air is of the order of that of an ordinary oven for baking biscuit-type products, that is to say 150° to 280° C. Air heated between 160° and 200° C. is preferably used, the baking of the granules thus taking place between a few seconds and a few minutes, for example from 20 seconds to three minutes. It will therefore be seen, from the foregoing, that it is much more economical in energy terms to carry out the baking of the biscuit dough in the form of granules rather than to bake the finished biscuit whole. Moreover, this baking can be carried out continuously.

The granules of biscuit dough, once baked according to step (c), are pressed in the mold of a molding press. For this purpose, the mold is filled with the granules in question, and by the intermediary of a piston (or of any other means of exerting an effective pressure) the granules are agglomerated, as a result of caking, in the form of a homogeneous whole of a shape corresponding to that of the mold. The pressures necessary for producing the desired biscuit vary to a considerable extent according to the type of dough constituting the granules and the possible presence of other food ingredients. The pressure is usually within the range from a few N to a few tens of N per cm². Pressures of 5 to 50 N/cm² at ordinary temperature are preferably adopted. However, if desired, the mold can be heated, for example towards 30° to 50° C., in order to accelerate the caking operation. As seen above, a binder can be added to the granules, before pressing, to increase the affinity between particles of the finished article.

Likewise, if desired, other ingredients or food additives, such as powdered coffee or chocolate, almonds, walnuts, ground hazelnuts, caramel, chopped dried fruit, etc., can be mixed with the granules before pressing. The user is therefore in a position to produce many varieties of biscuits, intervening only at the final stage of preparation and using only ingredients which show good properties of preservation in storage. In fact, the granules themselves are stabilized as a result of the effect of baking in hot air and, once packaged, are preserved for a very long time. It is therefore possible to keep in stock granules obtained from various doughs and suitable for biscuits of various types and to use these granules, as required, just at the moment of pressing. This possibility constitutes another of the many advantages of the invention. Moreover, composite articles, for example layered articles, can be provided, if layers of different granules alternate in the mold, for example layers of dough granules alternating with granules of almonds or chocolate.

The following examples illustrate the invention in detail.

EXAMPLE 1

The following ingredients were placed in a HOBART MIXER and were mixed until a homogeneous mixture was obtained.

Wheat flour: 150 g
Chemical yeast: 4.5 g
Icing sugar: 35 g
Granulated sugar: 17.5 g
Biscuitine (fatty body): 36 g
Powdered eggs: 3 (17 g)
Salt: 0.9 g
Water: 21 ml.

The composition obtained in this way was placed in a kneader heated to 150° C. and was worked for 20 minutes at this temperature, thus providing moderately fine fragments. These granules were subsequently baked in an oven at 200° in an air stream for 5 to 10 minutes. These granules were placed in a press mold and pressing was carried out at 20 N/cm².

A shortbread-type biscuit of good stability was obtained in this way, the taste of which did not differ from that of shortbread prepared by conventional means.

EXAMPLE 2

The following ingredients were mixed intimately in a HOBART MIXER:

Flour: 150 g
Yeast: 4.5 g
Icing sugar: 20 g
Coconut fat: 18 g
Biscuitine: 18 g
1 whole egg and 2 egg yolks: —
Salt: 0.9 g
Powdered milk: 3 g
Water: 30 ml.

The mixture was subsequently heated for 10 minutes at 150° C. in a kneader, 15 g of icing sugar and 17.5 g of crystallized sugar were also added, and the mixture was kneaded for 10 minutes at 150° C. It was allowed to cool. Two beaten egg whites were then added, and the mixture was kneaded for five minutes at ambient temperature (20° C.).

Relatively coarse granules were obtained in this way, the size of which was further reduced in a granulator until particles of 1 and 2 mm were obtained.

These granules were baked for three minutes at 180° C. in a rising stream of forced air, after being sprinkled with a concentrated aqueous solution of lactose, and were pressed into biscuits at 20 N/cm².

EXAMPLE 3

The same procedure as in Example 1 was adopted, and the following ingredients were mixed intimately in a HOBART MIXER at ambient temperature:
Wheat flour: 600 g
Yeast: 7 g
Granulated sugar: 180 g
Biscuitine (fatty substance): 75 g
Powdered skimmed milk: 12 g
Salt: 4 g
Water: 120 g.

After the dough had been kneaded and worked for 20 minutes, it was introduced into a granulator of ALEXANDERWERT HEYNAU, Munich. This apparatus essentially comprises two rollers which are in contact with one another along a generating line and which rotate in opposite directions. The surface of one of the rollers has a rough texture (a fine-mesh netting), so as to prevent the slipping of the dough portions which the movement of the rollers drives between the latter. The second roller is hollow, and its cylindrical surface is perforated with a plurality of calibrated holes (at 2 or 3 mm in the present case); the dough pressed between the rollers is forced through these holes and re-emerges in the central part of the roller in the form of granules calibrated to the diameter of the holes.

After these granules had been allowed to stand for two hours at 4° C., they were introduced into a device in the shape of a funnel with a flat porous bottom (similar to a funnel with a sintered-glass bottom), and a stream of hot air (190°-210° C.) was directed via the lower end of this funnel, so that the particles were suspended (fluidized bed). The passage of air was maintained for 40-70 seconds, depending on the desired degree of baking, the colour of the particles changing from pale yellow (low baking) to brown (more intensive baking). In the present case, the baking time was 55 seconds at 190° C.

After brief sprinkling of the baked granules with a saturated solution of glucose (15 g of sugar and 35 g of $H_2O$) in the proportion of 3.5% by weight, a homogeneous mixture of these granules and of chocolate granules (grain size 1 mm) was prepared in proportions of 70% by weight of biscuit granules and 30% by weight of chocolate granules. This mixture was placed in a mold and pressing into shape was carried out at 10 $N/cm^2$. Chocolate biscuits (A) of slightly granular texture and excellent taste were thus obtained.

As an alternative to the present example, other mixtures of baked granules described above were made with other ingredients such as the following:
(B) Granules 80%—grated hazelnuts (1–2 mm) 20%
(C) Granules 90%—crushed hard nougat (10%)
(D) Granules 70%—grated hazelnuts (15%)—dark chocolate (1–2 mm) 15%.

These mixtures (B), (C) and (D) were molded by being pressed in a piston mold, as described in the preceding examples, so as to form corresponding cake biscuits. All these products had excellent taste qualities.

EXAMPLE 4

The procedure adopted was exactly the same as that in Example 3, using the following ingredients:
Flour: 600 g
Yeast: 7 g
Castor sugar: 140 g
Biscuitine: 47 g
Powdered dark chocolate (with 30% fatty substances): 80 g
Powdered milk (skimmed): 12 g
Salt: 4 g
Water: 120 g.

After kneading, granulation, baking and caking, excellent chocolate biscuits of fine homogeneous texture were obtained, the chocholate being dispersed intimately in the biscuit material.

EXAMPLE 5

The procedure adopted was the same as that in Example 3, and caked biscuits with a salty taste were obtained from the following ingredients:
Wheat flour: 605 g
Corn starch: 30 g
Oleo: 35 g
Margarine: 85 g
Icing sugar: 30 g
Malt extract: 3 g
Egg yolks (powder): 24 g
Salt: 24 g
Yeast: 7 g
Fresh milk: 157 g.

After the dough had been kneaded, it was granulated to 3 mm, and the granules were baked for 60 seconds at 210° C. and then pressed into shape at 25 $N/cm^2$.

We claim:

1. In a process for producing a bakery food product selected from group consisting of biscuits, shortbread, crackers and petit fours wherein the ingredients for said product including cereal flour, fatty substances, sweetening sugars, milk, seasoning products, salt and yeast are mixed together with water to form a dough and then baked, the improvement comprising the steps of:
    (a) intimately mixing said ingredients together with a quantity of water which is between 10 and 70% of the 400 g water to 1 kg dough conventionally used to prepare the dough for said product;, and then
    (b) fragmenting the resulting mixture into granules;
    (c) simultaneously or subsequently baking the granules; and
    (d) pressing the granules together and caking in a mold, so as to form a baked product.

2. A process as claimed in claim 1, wherein step (b) is executed at a temperature of 20° to 280° C.

3. A process as claimed in claim 2, wherein, during step (b), the granules are given a specific particle size by means of a granulating machine.

4. A process as claimed in claim 1, wherein the baking treatment takes place after step (b) and involves agitating the granules in a hot-air stream.

5. A process as claimed in claim 4, wherein baking is carried out in a stream of forced air or a fluidized bed, the air is heated to between 150° and 280° C., and said baking takes place in from 30 seconds to three minutes.

6. A process as claimed in claim 1, wherein the pressure employed in step (d) is 5–50 $N/cm^2$ at ambient temperature.

7. A process as claimed in claim 1, wherein, before step (d), an agglomerating additive is added to the granules.

8. A process as claimed in claim 1 wherein a composite product is produced by pressing together granules originating from different doughs.

9. A process as claimed in claim 1 wherein the baking of the granules takes place during step (b).

* * * * *